United States Patent
Shibatani et al.

(10) Patent No.: US 7,706,652 B2
(45) Date of Patent: Apr. 27, 2010

(54) OPTICAL WAVEGUIDE DEVICE, OPTICAL MODULE AND METHOD OF ALIGNING OPTICAL AXES THEREOF

(75) Inventors: Kazuhiro Shibatani, Sakai (JP); Yukinobu Nakabayashi, Hachioji (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 23 days.

(21) Appl. No.: 12/051,216

(22) Filed: Mar. 19, 2008

(65) Prior Publication Data

US 2009/0060414 A1   Mar. 5, 2009

(30) Foreign Application Priority Data

Mar. 23, 2007   (JP) ............................. 2007-076077

(51) Int. Cl.
| | |
|---|---|
| G02B 6/10 | (2006.01) |
| G02B 6/12 | (2006.01) |
| G02B 6/26 | (2006.01) |
| G02B 6/30 | (2006.01) |
| G02B 6/42 | (2006.01) |
| H01J 3/14 | (2006.01) |
| H01J 5/16 | (2006.01) |
| H01J 40/14 | (2006.01) |

(52) U.S. Cl. ........................... 385/129; 385/14; 385/15; 385/31; 385/33; 385/49; 385/132; 250/234

(58) Field of Classification Search .................. 385/14, 385/15, 31, 33, 129, 132, 49; 250/234
See application file for complete search history.

(56) References Cited

U.S. PATENT DOCUMENTS

| 6,069,990 A | * | 5/2000 | Okawa et al. ................. 385/43 |
| 7,043,118 B2 | | 5/2006 | Arimoto et al. ............... 385/31 |

FOREIGN PATENT DOCUMENTS

| JP | 2002-95272 A | 3/2002 |
| JP | 2003-338795 A | 11/2003 |

* cited by examiner

*Primary Examiner*—Frank G Font
*Assistant Examiner*—Jerry Blevins
(74) *Attorney, Agent, or Firm*—Sidley Austin LLP

(57) ABSTRACT

An optical waveguide device includes: a channel waveguide which is positioned at a predetermined height relative to a bottom surface of a substrate; and a slab waveguide having a cross-sectional shape wider than that of the channel waveguide, being positioned at a predetermined height relative to the channel waveguide. Initially, an input end face of the optical waveguide device is vertically scanned with a light beam to achieve optical coupling with the slab waveguide, followed by transversely scanning to achieve optical coupling with the channel waveguide, hence, alignment of an optical axis with a minute channel waveguide can be effected easily and quickly.

6 Claims, 7 Drawing Sheets

OPTICAL WAVEGUIDE DEVICE, OPTICAL MODULE AND METHOD OF ALIGNING OPTICAL AXES THEREOF

BACKGROUND OF THE INVENTION

1. Field of the Invention

The present invention relates to an optical waveguide device for facilitating alignment of optical axes between a light source such as laser device and the optical waveguide device, an optical module including the optical waveguide device, and a method of aligning the optical axes thereof.

2. Description of the Related Art

An optical module having an optical waveguide device generally requires optical coupling between a light source and an optical channel waveguide for optical waveguide function as well as desired functions, such as light modulation, wavelength filtering or optical combining/splitting.

The following Patent Document 1 discloses a technique in which a condenser lens is placed between a laser source and an entrance surface of an optical fiber in an optical communication module and optical axis error signals are obtained by wobbling the condenser lens with constant period and amplitude in X-direction or Y-direction using an actuator.

The related prior art is listed as follows: Japanese Patent Unexamined Publication (koukai) JP-2003-338795, A.

A optical input/output end face of optical waveguide devices generally has an area of as much as 1 mm×1 mm, in which a cross-sectional dimension of a channel waveguide for optical coupling is several micrometers square, being extremely smaller than the area of the entire device.

In case where the optical input/output end face of optical waveguide devices is raster-scanned to seek for the channel waveguide, it takes an extremely long time to scan it with a scanning pith of several micrometers.

SUMMARY OF THE INVENTION

It is an object of the invention to provide an optical waveguide device and an optical module in which alignment of an optical axis with a minute channel waveguide can be effected easily and quickly, and to provide a method of aligning the optical axis thereof.

In order to achieve the object, there is provided an optical waveguide device according to the present invention, including:

a channel waveguide which is positioned at a predetermined height relative to a bottom surface of a substrate; and a slab waveguide having a cross-sectional shape wider than that of the channel waveguide, being positioned at a predetermined height relative to the channel waveguide.

In the optical waveguide device according to the invention, the channel waveguide is preferably positioned at the same height as the slab waveguide.

In the optical waveguide device according to the invention, the channel waveguide and the slab waveguide preferably have substantially the same thickness.

In the optical waveguide device according to the invention, the channel waveguide is preferably positioned at a given vertical distance from the slab waveguide.

In the optical waveguide device according to the invention, the slab waveguide preferably has a cross-sectional width decreasing from the light input side toward the light output side.

In the optical waveguide device according to the invention, the slab waveguide is preferably a tapered waveguide.

In the optical waveguide device according to the invention, an exit position of the channel waveguide and an exit position of the slab waveguide are preferably close to each other.

In the optical waveguide device according to the invention, the channel waveguide preferably has at least one of functions of higher harmonics generation, optical modulation, optical waveguiding, and wavelength filtering.

Further, there is provided an optical waveguide device according to the present invention, including:

a channel waveguide which is positioned at a predetermined height relative to a bottom surface of a substrate; and a slab waveguide having a cross-sectional shape wider than that of the channel waveguide, wherein the slab waveguide is positioned at a predetermined distance relative to the channel waveguide.

In the optical waveguide device according to the invention, it is preferable that the channel waveguide and the slab waveguide have substantially the same thickness, and the slab waveguide has a cross-sectional width decreasing from the light input side toward the light output side, and an exit position of the channel waveguide and an exit position of the slab waveguide are close to each other.

Also, there is provided an optical module according to the present invention, including:

the above-described optical waveguide device;

an optical transmission device for transmitting light emitted from a light source into the optical waveguide device; and an actuator for positioning the optical transmission device in a plane perpendicular to an optical axis thereof.

In the optical module according to the invention, the optical transmission device is preferably a coupling lens or an optical fiber.

In the optical module according to the invention, the actuator is preferably a smooth impact drive mechanism.

In the optical module according to the invention, the module preferably further includes a photo detector for measuring light emitted from the channel waveguide and the slab waveguide.

Also, there is provided a method of aligning optical axes in the optical module, according to the present invention, including steps of:

performing scanning in a vertical direction with an optical transmission device while measuring intensity of light emitted from a slab waveguide using a photo detector located on the light output side of an optical waveguide device; and performing scanning in a transverse direction with the optical transmission device while measuring intensity of light emitted from a channel waveguide, after completion of the vertical scanning with the optical transmission device.

Preferably, the method of aligning the optical axes in the optical module, according to the invention, further including a step of changing by a predetermined distance the height of the transverse scanning with the optical transmission device, after the vertical scanning and before the transverse scanning with the optical transmission device.

According to the present invention, the optical waveguide device is provided with the slab waveguide having a cross-sectional shape wider than that of the channel waveguide, the slab waveguide being positioned at a predetermined height relative to the channel waveguide, thereby enabling easy and quick alignment of the optical axis with the channel waveguide.

In the method of aligning the optical axes, initially, the optical transmission device located between the light source and the optical waveguide device is displaced in the vertical direction to perform vertical scanning with the optical transmission device, so that the height of the optical axis of the slab waveguide can be detected. Subsequently, the optical transmission device is displaced in the transverse direction to perform transverse scanning with the optical transmission device, so that the optical axis of the channel waveguide can be detected. Thus the alignment of the optical axis of the optical transmission device is completed by the vertical and transverse scanning. As a result, the alignment of the optical axis can be effected in a remarkably shorter time, compared with a conventional method in which a whole end face of the optical waveguide device is subjected to raster scanning.

DETAILED DESCRIPTION OF THE PREFERRED EMBODIMENTS

This application is based on an application No. 2007-76077 filed on Mar. 23, 2007 in Japan, the disclosure of which is incorporated herein by reference.

Hereinafter, preferred embodiments will be described with reference to drawings.

Figure 1:
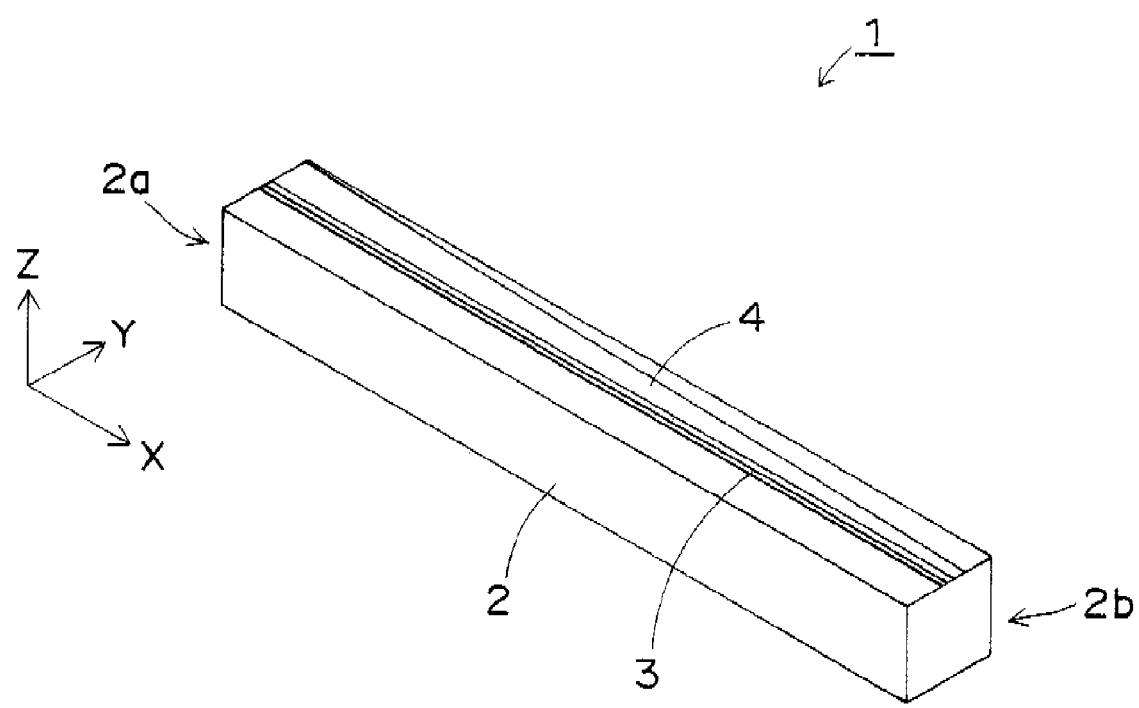
FIG. 1 is a perspective view showing an example of an optical waveguide device according to an embodiment of the present invention.

FIG. 1 is a perspective view showing an example of an optical waveguide device according to an embodiment of the present invention. Herein, an SHG (Second Harmonic Generation) device is shown by way of the optical waveguide device. For clear understanding, a direction of an optical axis of the device is set as X-axis, a direction of a width of the device is set as Y-axis, and a direction of a height of the device is set as Z-axis.

The SHG device 1 is composed of a substrate 2, a channel waveguide 3 positioned on a top surface of the substrate 2, and a slab waveguide 4 positioned adjacent to the channel waveguide 3.

The substrate 2 is composed of non-linear material, such as lithium niobate crystal, and is generally formed in a shape of a plain plate or a rectangular column, each having a rectangular section. An input end face 2a and an output end face 2b of the device each have sectional dimensions of, e.g., 1 mm×1 mm.

The channel waveguide 3 generally has a sectional area of several micrometers square with a constant sectional shape lying from the input end face 2a to the output end face 2b, and has an SHG function of interacting with light propagated through the channel waveguide 3 to produce light with half a wavelength of the propagated light. On condition that infrared light having a wavelength of 900 to 1,300 nm is incident along the channel waveguide 3, for instance, the light is converted into visible light having a wavelength of 450 to 650 nm. In order to increase wavelength conversion efficiency, the channel waveguide 3 generally has a periodic domain inversion structure for phase matching between the infrared light and the visible light.

In a case where the slab waveguide 4 is thicker than the channel waveguide 3, height adjustment of the channel waveguide 3 is required, therefore, it is preferable that the thickness of the slab waveguide 4 is substantially equal to or smaller than the thickness of the channel waveguide 3. The slab waveguide 4 is preferably configured to have a cross-sectional shape wider than that of the channel waveguide 3 on the input end face 2a, with a cross-sectional shape wider than that of the channel waveguide 3, and with the cross-sectional width being monotonously decreasing from the input end face 2a toward the output end face 2b. The slab waveguide 4 is more preferably a tapered waveguide. The slab waveguide 4 is positioned on the top surface of the substrate 2 so as to be level with the channel waveguide 3.

The slab waveguide 4 is configured as a tapered waveguide having a thickness as approximately large as that of the channel waveguide 3, on the input end face 2a, with a cross-sectional shape wider than that of the channel waveguide 3, and with the cross-sectional width being monotonously decreasing from the input end face 2a toward the output end face 2b. The slab waveguide 4 is positioned on the top surface of the substrate 2 so as to be level with the channel waveguide 3.

The slab waveguide 4 has a function that a light beam can be reliably captured even if the light beam is deviated in Y-direction when the input end face 2a is scanned with the light beam in the vertical direction (Z-direction). In other words, since on the input end face 2a, the cross-sectional width of the slab waveguide 4 is remarkably larger than that of the channel waveguide 3, it is remarkably easier to make the light beam incident into the slab waveguide 4 than into the channel waveguide 3.

At the moment that the light beam is incident into the slab waveguide 4, the height of the light beam coincides with the height of the slab waveguide 4. In the SHG device 1 shown in FIG. 1, the slab waveguide 4 is formed in advance so as to be level with the channel waveguide 3, and thus the height of the light beam coincides also with the height of the channel waveguide 3. In this stage, therefore, vertical alignment of the light beam is completed.

Subsequently, when the input end face 2a is scanned with the light beam in the transverse direction (Y-direction), the light beam is likely to come incident into the channel waveguide 3. Thus, detection of the optical axis on the basis of the Y-direction scanning can be completed in a short time, because the vertical alignment of the light beam has already been completed.

On the output end face 2b of the SHG device 1, on the other hand, the cross-sectional width of the slab waveguide 4 is relatively small, and thus a position where the light beam emits from the slab waveguide 4 is kept generally constant, so that an optical output in a slab mode can easily be detected by a photo detector, such as small-diameter photodiode. Such a photo detector can measure amount of light entering the waveguide, and then alignment is preferably performed based on the measured value.

Figure 2:
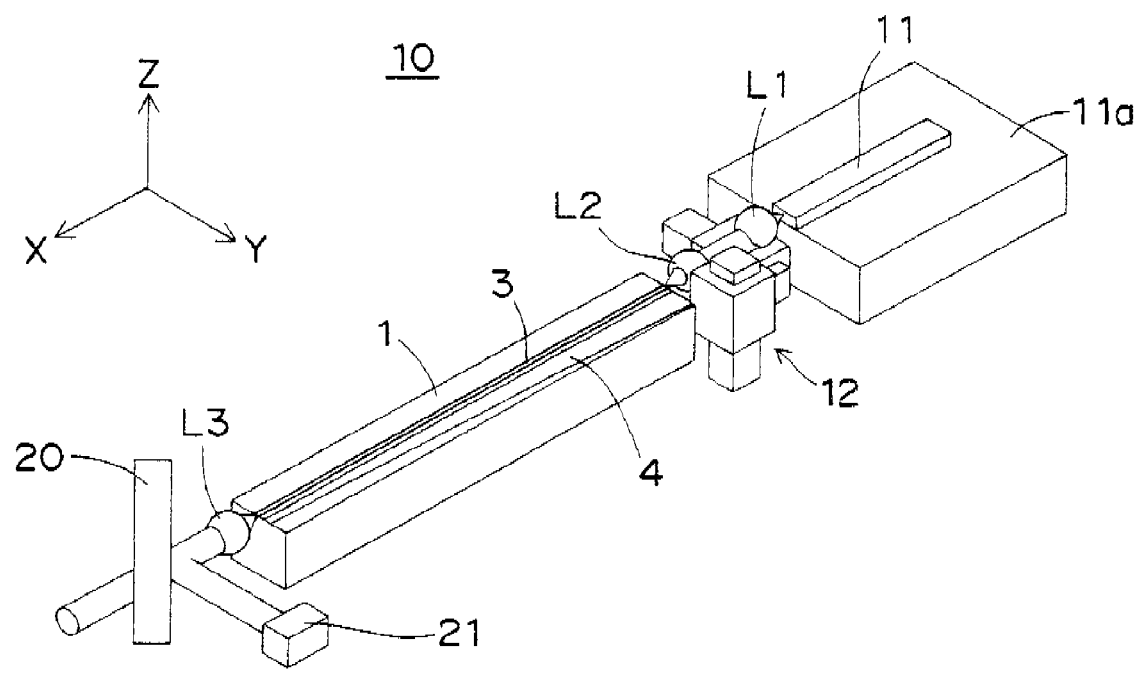
FIG. 2 is a perspective view showing an example of an optical module with the SHG device 1 shown in FIG. 1.

FIG. 2 is a perspective view showing an example of an optical module with the SHG device 1 shown in FIG. 1. The optical module 10 includes a laser device 11, a collimating lens L1, a condensing lens L2, the SHG device 1 and an output lens L3, and further includes an actuator 12 for positioning the lenses L1 and L2.

The laser device 11 is composed of semiconductor laser, solid state laser or the like and is fixed onto a top surface of a heat sink 11a.

The collimating lens L1 converts light diverging from the laser device 11 into approximately parallel light. The condensing lens L2 condenses the parallel light from the collimating lens L1 to form a beam spot on the input end face 2a of the SHG device 1. The collimating lens L1 and the condensing lens L2 act as an optical transmission device for transmitting the light emitted from the laser device 11 into the SHG device 1.

The output lens L3 condenses light emitted from the output end face 2b of the SHG device 1 to output the light into a next stage.

The actuator 12 has a function of positioning the collimating lens L1 and the condensing lens L2 in planes perpendicular to optical axes thereof, and may be composed of, for instance, a smooth impact drive mechanism (SIDM) as disclosed in JP-2002-95272A.

The SIDM is composed of a movable member having a certain mass, a rod for holding the movable member by friction, a piezoelectric device interposed between the rod and a fixed member (base), and the like. In an operation thereof, the rod is displaced in the longitudinal direction thereof due to extending and contracting motions of the piezoelectric device, and changing the forward and backward velocities in a sawtoothed drive can select whether the movable member will stand still by inertia or will follow the rod, so that the movable member can be cumulatively displaced.

In FIG. 2, the actuator 12 has a first SIDM which can be displaced in Z-direction relative to a base (not shown) and a second SIDM which is mounted on a movable member of the first SIDM and can be displaced in Y-direction, so that the collimating lens L1 can be positioned in Y-direction and the condensing lens L2 can be positioned in Z-direction.

On the output side of the optical module 10, located are a beam splitter 20 for reflecting part of light outputted from the output lens L3 and permitting the remainder to pass therethrough, and a monitoring photodiode 21 for receiving the light reflected by the beam splitter 20.

On the output end face 2b of the SHG device 1, as shown in FIG. 1, an exit position of the channel waveguide 3 and an exit position of the slab waveguide 4 are close to each other. Therefore, light rays emitted from both can be detected by the single photodiode 21. Also, the output from the channel waveguide 3 and the output from the slab waveguide 4 can be independently detected by adjustment of the exit positions of the both waveguides and adjustment of the monitoring optical system.

Figure 3A:
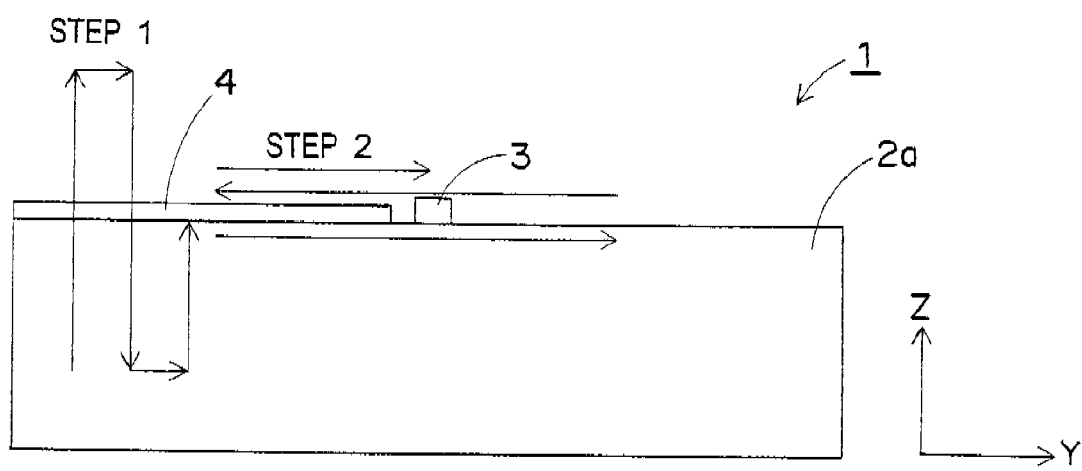
FIG. 3A is an explanatory drawing showing an example of a method of aligning the optical axes in the optical module according to the present invention.
Figure 3B:
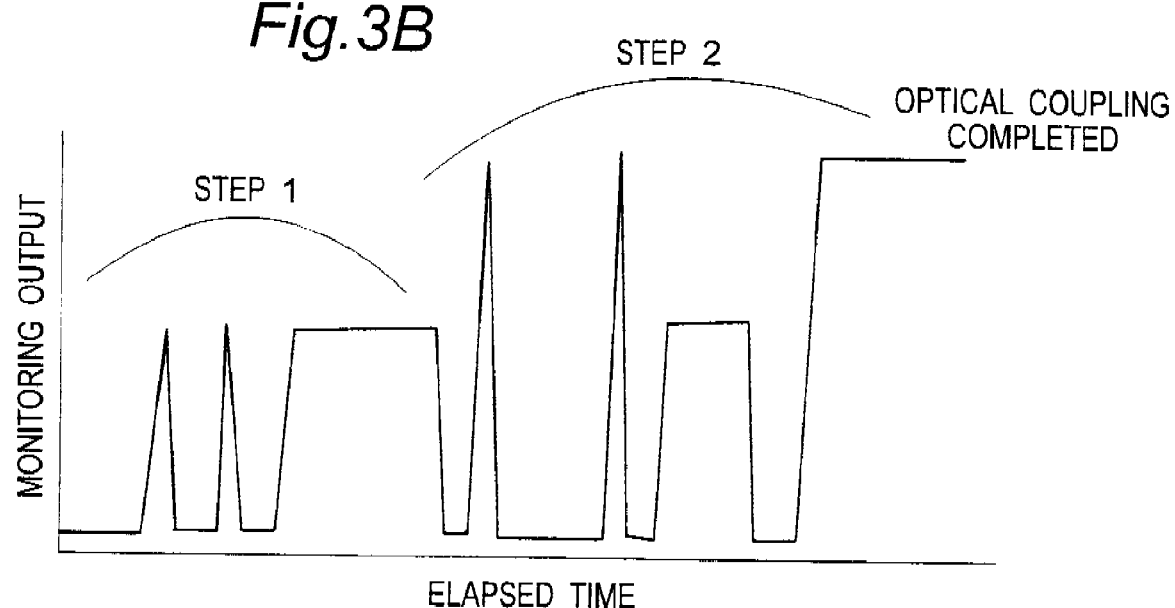
FIG. 3B is a graph showing temporal changes in a monitoring output during alignment of the optical axis.

FIG. 3A is an explanatory drawing showing an example of a method of aligning the optical axes in the optical module according to the present invention. FIG. 3B is a graph showing temporal changes in a monitoring output during alignment of the optical axis. The displacement of the collimating lens L1 in Y-direction and the displacement of the condensing lens L2 in Z-direction are effected by driving the actuator 12 as shown in FIG. 2, and the input end face 2a of the SHG device 1 is thereby scanned in Y-direction or Z-direction with a light beam from the condensing lens L2.

In step 1, initially, the collimating lens L1 is displaced in Y-direction and the Y-position of the light beam is thereby adjusted roughly so that the light beam will be incident into the slab waveguide 4 on occasion of scanning in Z-direction. The step can easily be attained because the slab waveguide 4 can be designed so as to be sufficiently wider than an effective stroke of the actuator 12.

Subsequently, scanning with the light beam in Z-direction (direction of height) is carried out by displacement of the condensing lens L2 in Z-direction while the collimating lens L1 is kept still. In this step, the light from the laser device 11 can be reliably coupled optically to the slab waveguide 4. That is, the optical coupling of the light beam with the slab waveguide 4 is effected when the height of the light beam coincides with the height at which the slab waveguide 4 is placed. The light beam can pass through the slab waveguide 4 and is then detected by the photodiode 21. The height of the condensing lens L2 is adjusted so that output of the photodiode 21 is maximized, thereby the height of the waveguides of the SHG device 1 can be determined, and the step 1 is terminated.

In step 2, subsequently, scanning with the light beam in Y-direction (transverse direction) is carried out by displacement of the collimating lens L1 in Y-direction while the condensing lens L2 is kept still. On condition that an actuating direction of the actuator 12 mounted with the collimating lens L1 is not perfectly parallel to the top surface of the substrate 2, an actual position of optical coupling is slightly shifted in Z-direction during the Y-directional scanning. Thicknesses of the optical waveguides are generally several microns.

In consideration of these facts, the Y-directional scanning is performed several times while adjustment of the Z-directional position is appropriately executed using the condensing lens L2. An appropriate range for the adjustment of the Z-directional position using the condensing lens L2 is approximately 1 micron, which is sufficiently smaller than the thicknesses of the waveguides. In accordance with this step, the optical coupling to the optical channel waveguide 3 is attained by a minimal number of times of scanning because the height of the optical axis has been approximately determined in advance in step 1.

After the optical coupling to the optical channel waveguide 3 is attained, fine adjustment of the optical axis may be performed by dither operation, hill-climbing control or the like of the light beam in Z-direction and Y-direction so that the output of the photodiode 21 is maximized. Thus setting may be made such that efficiency of the optical coupling to the optical channel waveguide 3 is maximized. During positional adjustment of the condensing lens L2 in order to search for a position exhibiting the maximum output from the photodiode 21, the condensing lens L2 is once moved over a position exhibiting a peak output from the photodiode 21 to a position exhibiting an obviously decreasing output, and then returned to the peak position, thereby exactly finding out the maximum output position.

Herein, an example of using the actuator 12 that can displace the collimating lens L1 in Y-direction and the condensing lens L2 in Z-direction has been described. Alternatively, the collimating lens L1 may be displaced in Z-direction and the condensing lens L2 may be displaced in Y-direction. Alternatively, there may be used an actuator that can displace one of the lenses L1 and L2 in both Y- and Z-directions with the other being fixed. The present invention can be similarly applied to the above examples.

Figure 4A:
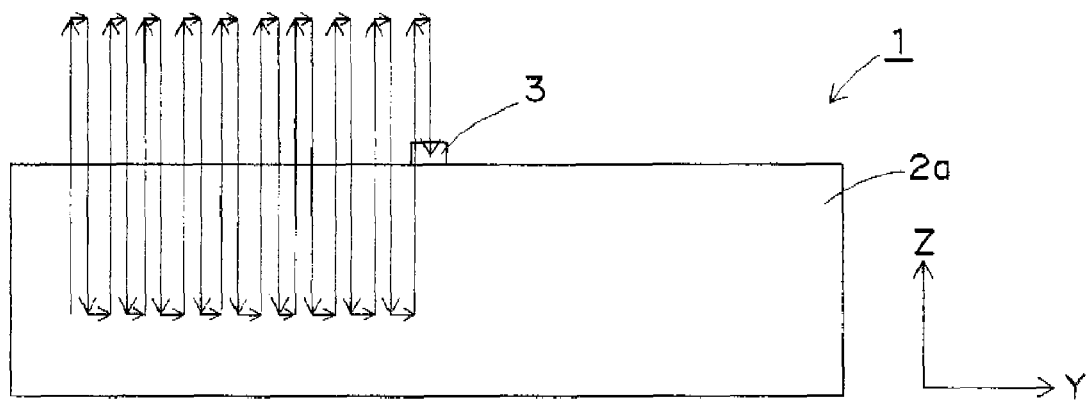
FIG. 4A is an explanatory drawing showing a comparative example of a method of aligning optical axes in an optical module in accordance with conventional raster scanning.
Figure 4B:
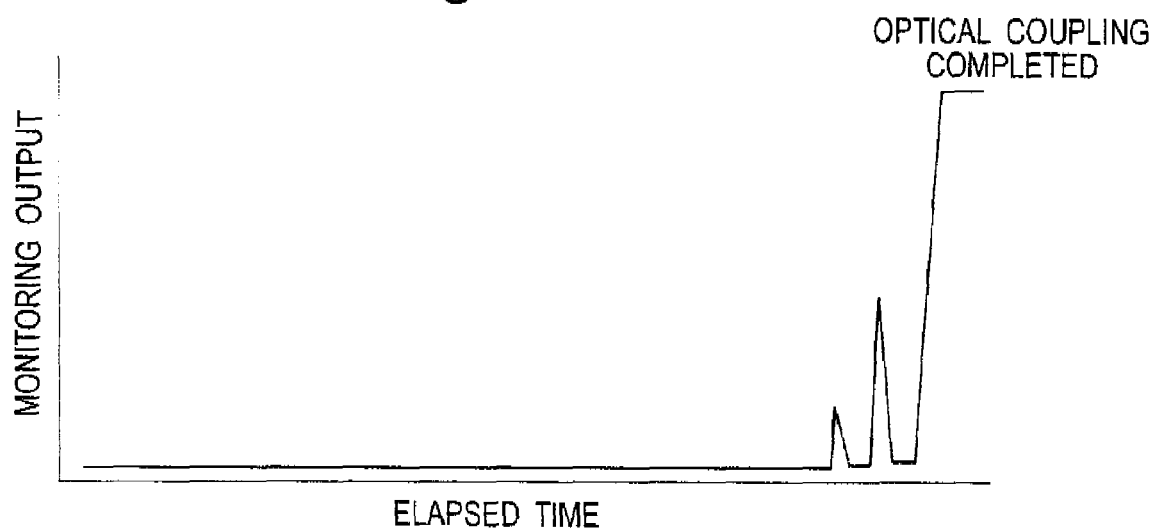
FIG. 4B is a graph showing temporal changes in a monitoring output during alignment of the optical axis.

FIG. 4A is an explanatory drawing showing a comparative example of a method of aligning optical axes in an optical module in accordance with conventional raster scanning. FIG. 4B is a graph showing temporal changes in a monitoring output during alignment of the optical axis. On the top surface of the substrate of the SHG device 1, only the channel waveguide 3 is provided and there is no slab waveguide according to the invention.

In such raster scanning, reciprocation scanning in Z-direction with a light beam is performed while scanning position is shifted with a minute pitch in Y-direction. In this case, no monitoring output can be observed until the light beam is coupled to the channel waveguide 3.

The positional shift between scanning lines in Y-direction has to be on the order of 1 micron so as not to skip over an optical coupling position because the width of the optical channel waveguide 3 is generally several microns. For the raster scanning in a range of 1 mm, accordingly, the Z-directional scanning has to be repeated about 1,000 times. As a consequence, it can be understood that total scanning time is considerably prolonged in comparison with the present invention.

Figure 5:
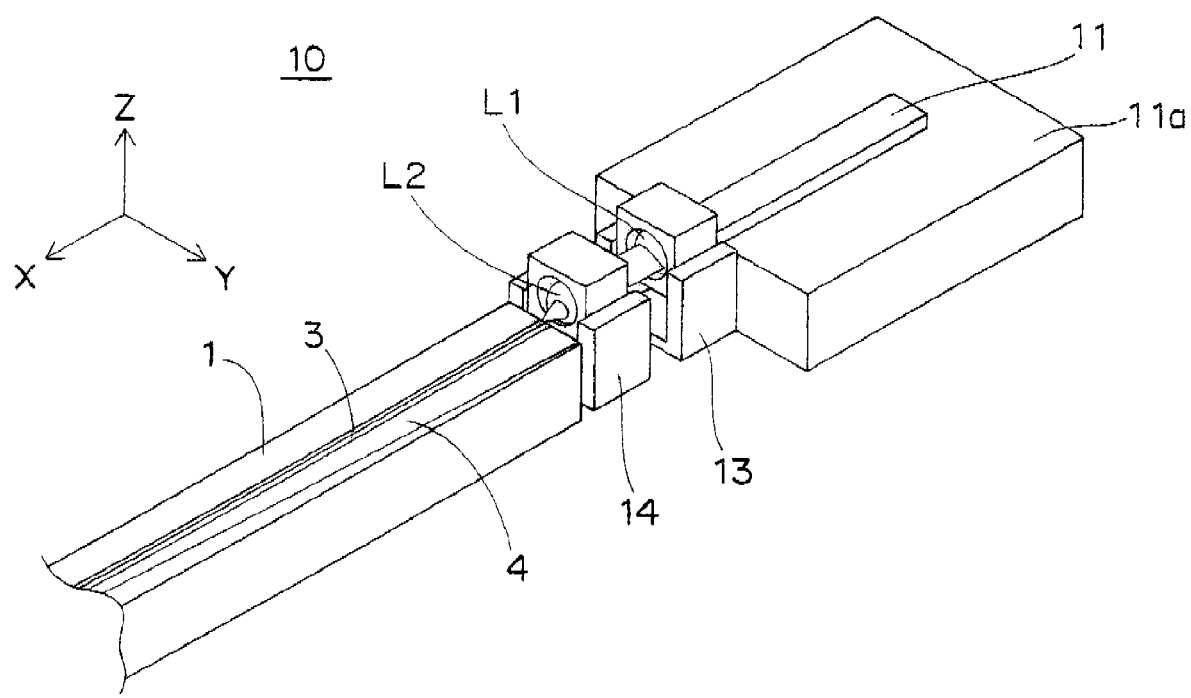
FIG. 5 is a perspective view showing another example of an optical module mounted with the SHG device 1 shown in FIG. 1.

FIG. 5 is a perspective view showing another example of an optical module mounted with the SHG device 1 shown in FIG. 1. The optical module 10 includes a laser device 11, a collimating lens L1, a condensing lens L2, the SHG device 1 and an output lens (not shown), and further includes holders 13 and 14 for fixing the lenses L1 and L2.

The optical module 10 has a configuration similar to that shown in FIG. 2, but the holders 13 and 14 are added thereto for permanently fixing the lenses L1 and L2 to a module enclosure (not shown) after completion of positional adjustment for the lenses L1 and L2.

The lenses L1 and L2 are held and pinched in the holders 13 and 14 each having a cross-section like a square bracket. For positional adjustment of the lenses L1 and L2, a fine adjustment mechanism, such as Y-Z stage, is attached thereto so that the holders 13 and 14 are independently positioned in Z- and Y-directions. Once the positional adjustment of the lenses L1 and L2 is completed, the holders 13 and 14 are completely fixed to the module enclosure using bonding, welding or the like. The fine adjustment mechanism used for the positional adjustment can be removed and reused.

At the step of positional adjustment of the lenses L1 and L2, the same algorithm as in the method of adjusting the positions of the lenses, as described in conjunction with FIG. 3 can be applied.

That is, the optical coupling to the slab waveguide 4 and the detection of the height of the optical axis are initially performed with the positional adjustment of the lenses (step 1 of FIG. 3), the lenses are moved in Y-direction with the detected height of the optical axis being kept thereabout (step 2 of FIG. 3), and thus the optical coupling to the channel waveguide 3 can be attained in a short time. In a case of employing an appropriate infrared laser device for the laser device 11, the channel waveguide 3 can emit blue light as a second harmonic wave, and combination with red and green laser devices can realize a light source for color image display.

Figure 6:
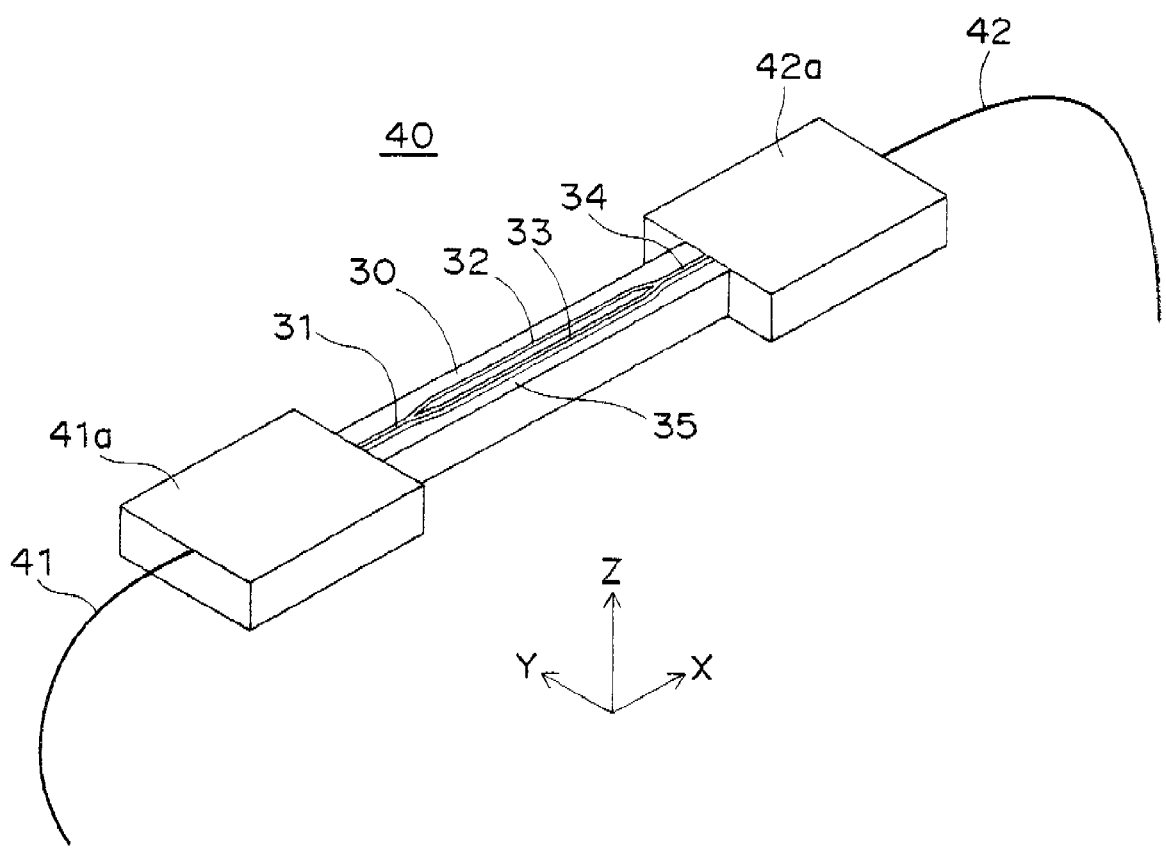
FIG. 6 is a perspective view showing an example of an optical module with an optical modulator installed.

FIG. 6 is a perspective view showing an example of an optical module with an optical modulator installed. The optical module 40 is composed of the optical modulator 30 of optical waveguide type, an optical fiber 41 located on the input side of the optical modulator 30, an optical fiber 42 located on the output side of the optical modulator 30 and the like.

One end of the optical fiber 41 on the input side is held by a holder 41a, and the other end thereof is coupled to a light source (not shown) such as laser device. The optical fiber 41 functions as an optical transmission device for transmitting light emitted from the light source into the optical modulator 30. One end of the optical fiber 42 on the output side is held by a holder 42a, and the other end thereof is coupled to another module (not shown).

The optical modulator 30 forms a Mach-Zehnder interferometer wherein, along a direction of light propagation, a channel waveguide 31, two channel waveguides 32 and 33 branched from the channel waveguide 31, and a channel waveguide 34, into which the channel waveguides 32 and 33 are merged, are located on a top surface of a substrate of, e.g., lithium niobate or the like. Adjacent to the channel waveguides 32 and 33, provided are electrodes (not shown) for optical modulation.

A slab waveguide 35 according to the present invention is provided in proximity to the channel waveguides 31, 33, and 34. The slab waveguide 35 has a thickness as approximately large as the channel waveguides 31 to 34, on an input end face with a cross-sectional shape wider than that of the channel waveguide 31, and positioned on the top surface of the substrate 2 so as to be level with the channel waveguides 31 to 34. Exit positions of the channel waveguides 31, 33, and 34 and an exit position of the slab waveguide 35 are preferably close to each other. Therefore, light rays emitted from both can be detected by the single photodiode.

In the conventional method of aligning optical axes using raster scanning, it is necessary to align optical waveguide portions of the optical fibers 41 and 42 having diameters of about ten microns with the optical channel waveguides 31 and 34 having widths and depths of several microns, in order to adjust positions of the fibers, and thus proficient skill and long working time are required.

In order to perform the method of aligning optical axes according to the present invention, the holder 41a is attached to a fine adjustment mechanism, such as Y-Z stage, so that the input end face 2a of the optical modulator 30 can be scanned in Y-direction or Z-direction with the tip end of the optical fiber 41. On the output side of the optical modulator 30, located is a monitoring photodiode for detecting light from the channel waveguides 31 to 34 and the slab waveguide 35.

At the step of positional adjustment of the optical fiber 41, the same algorithm as in the method of adjusting the positions of the lenses, as described in conjunction with FIG. 3 can be applied.

That is, the optical coupling to the slab waveguide 35 and the detection of the height of the optical axis are initially performed with the positional adjustment of the optical fiber 41 (step 1 of FIG. 3), the optical fiber 41 is moved in Y-direction with the detected height of the optical axis being kept thereabout (step 2 of FIG. 3), and thus the optical coupling to the channel waveguide 31 can be attained in a short time.

Once the positional adjustment of the optical fiber 41 is completed, the holder 41a is permanently fixed to a module enclosure (not shown). The fine adjustment mechanism used for the positional adjustment can be removed and reused.

Figure 7:
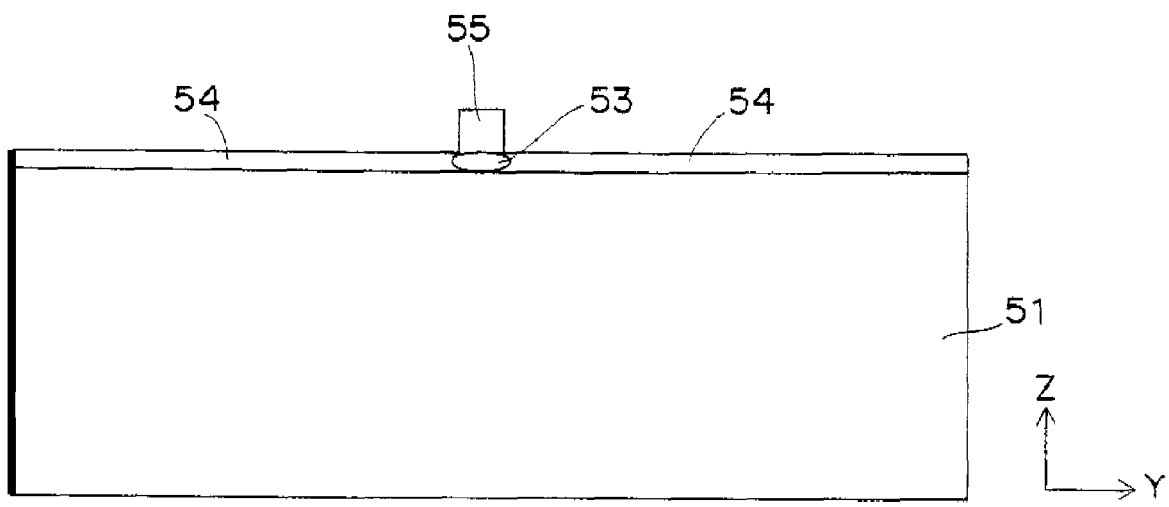
FIG. 7 is a sectional view showing another example of an optical waveguide device to which the invention can be applied.

FIG. 7 is a sectional view showing another example of an optical waveguide device to which the invention can be applied. Herein, the optical waveguide device configured as a loaded optical waveguide will be exemplified. In the loaded optical waveguide, in general, a substrate crystal 51 has a slab waveguide 54 formed thereon which waveguide has a refractive index higher than the substrate crystal 51 has, and the slab waveguide 54 has a stripline 55 formed thereon which has a higher refractive index.

The slab waveguide 54 is produced with a small film thickness so as to satisfy a cut-off condition resisting propagation of light. The stripline 55 is designed with its width adjusted so that light may not be guided through the stripline 55.

In such a structure of loaded type, an equivalent refractive index in a region of the slab waveguide 54 immediately under the stripline 55 increases, so that the region functions as the channel waveguide 53.

In order to perform the method of aligning optical axes according to the present invention, a monitoring photodiode for detecting light from the channel waveguide 53 and the slab waveguide 54 is located on the output side of the optical waveguide device. In this arrangement, the film thickness of the slab waveguide 54 is preferably set in the vicinity of the cut-off condition so that light incident on the slab waveguide 54 can pass through the slab waveguide 54 while being attenuated.

In optical coupling to the optical waveguide device having such a structure also, therefore, the optical coupling using slab mode according to the invention can be performed so that steps of the optical coupling may be simplified.

Figure 8:
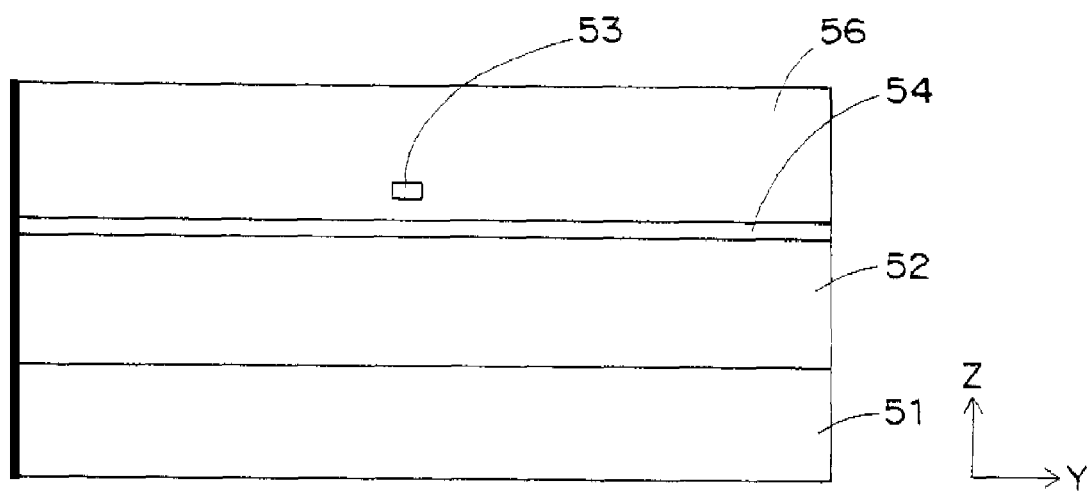
FIG. 8 is a sectional view showing still another example of an optical waveguide device to which the invention can be applied.

FIG. 8 is a sectional view showing still another example of an optical waveguide device to which the invention can be applied. In the optical waveguide device, the channel waveguide 53 is positioned at a given vertical distance from the slab waveguide 54 instead of being placed level with the slab waveguide 54.

A cladding layer 52 made of material, such as glass, having a lower refractive index is formed on a substrate crystal 51, such as quartz, the slab waveguide 54 made of material having a refractive index higher than the clad layer 52 is formed on the cladding layer 52, and a cladding layer 56 made of material having a lower refractive index is formed on the slab waveguide 54.

Inside the cladding layer 56, the channel waveguide 53 is embedded at a predetermined height from a bottom surface of the substrate crystal 51. The channel waveguide 53 and the slab waveguide 54 are positioned at a distance from each other such that optical coupling to each other is prevented. The distance, depending on size of guided optical mode, is generally in a range of 10 to 20 microns and may be formed with more precise adjustment.

In order to perform the method of aligning optical axes according to the present invention, a monitoring photodiode for detecting light from the channel waveguide 53 and the slab waveguide 54 is placed on the output side of the optical waveguide device.

On condition that an optical fiber is provided as an optical transmission device on the input side of the optical waveguide device as in FIG. 6, in a step of positional alignment of the optical fiber, optical coupling to the slab waveguide 54 and detection of a height of an optical axis are initially performed with positional adjustment of the optical fiber, in a manner similar to step 1 of FIG. 3.

Next, there is added a step in which the height of transverse scanning with the optical fiber is subsequently changed by a distance corresponding to the distance between the center of the channel waveguide 53 and the center of the slab waveguide 54.

The optical fiber is thereafter moved in Y-direction as in step 2 of FIG. 3 and thus the optical coupling to the channel waveguide 53 can be attained in a short time.

In this manner, the method of aligning optical axes according to the present invention can be applied to a common optical waveguide device, as long as not only the channel waveguide for fulfilling an intrinsic function of the device but the slab waveguide that enables light propagation in slab mode resides in the device. In such a device in which the channel waveguide is not level with the slab waveguide, optical axis alignment can be promptly achieved by adding a step of changing the height of the transverse scanning. Please note that an object to be optically aligned may be a general lens, optical fiber, optical waveguide device, etc.

In the above description, the channel waveguide of the optical waveguide device having functions of higher harmonics generation, optical modulation or optical waveguiding have been exemplified. The present invention also can be applied similarly to a channel waveguide having a function of wavelength filtering or having two or more of the above functions.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical module comprising:
   an optical waveguide device including:
      a channel waveguide which is positioned at a predetermined height relative to a bottom surface of a substrate; and
      a slab waveguide having a cross-sectional shape wider than that of the channel waveguide, being positioned at a predetermined height relative to the channel waveguide;
   an optical transmission device for transmitting light emitted from a light source into the optical waveguide device; and
   an actuator for positioning the optical transmission device in a plane perpendicular to an optical axis of the optical waveguide device.

2. The optical module according to claim 1, wherein the optical transmission device is a coupling lens or an optical fiber.

3. The optical module according to claim 1, wherein the actuator is a smooth impact drive mechanism.

4. The optical module according to claim 1, further comprising a photo detector for measuring light emitted from the channel waveguide and the slab waveguide.

5. A method of aligning optical axes in an optical module which comprises: an optical waveguide device including a channel waveguide which is positioned at a predetermined height relative to a bottom surface of a substrate, and a slab waveguide having a cross-sectional shape wider than that of the channel waveguide, being positioned at a predetermined height relative to the channel waveguide; an optical transmission device for transmitting light emitted from a light source into the optical waveguide device; and an actuator for positioning the optical transmission device in a plane perpendicular to an optical axis of the optical waveguide device, the method comprising the steps of:
   performing scanning in a vertical direction with an optical transmission device while measuring intensity of light emitted from a slab waveguide using a photo detector located on the light output side of an optical waveguide device; and
   performing scanning in a transverse direction with the optical transmission device while measuring intensity of light emitted from a channel waveguide, after completion of the vertical scanning with the optical transmission device.

6. The method according to claim 5, further including a step of changing by a predetermined distance the height of the transverse scanning with the optical transmission device, after the vertical scanning and before the transverse scanning with the optical transmission device.

* * * * *